United States Patent
Sugimoto

(10) Patent No.: US 7,618,569 B2
(45) Date of Patent: Nov. 17, 2009

(54) ATTITUDE ADJUSTING DEVICE FOR SPHERE AND GOLF BALL MANUFACTURING METHOD

(75) Inventor: Kazushige Sugimoto, Kobe (JP)

(73) Assignee: SRI Sports Limited, Kobe (JP)

( * ) Notice: Subject to any disclaimer, the term of this patent is extended or adjusted under 35 U.S.C. 154(b) by 262 days.

(21) Appl. No.: 10/712,095

(22) Filed: Nov. 14, 2003

(65) Prior Publication Data

US 2004/0093710 A1    May 20, 2004

(30) Foreign Application Priority Data

Nov. 19, 2002    (JP)    .............................. 2002-335634

(51) Int. Cl.
*B29C 70/70*    (2006.01)
*B29C 37/02*    (2006.01)

(52) U.S. Cl. ..................... 264/161; 264/162; 264/279.1

(58) Field of Classification Search ............... 264/279.1, 264/248, 161, 162
See application file for complete search history.

(56) References Cited

U.S. PATENT DOCUMENTS

| | | | | |
|---|---|---|---|---|
| 1,054,721 A | * | 3/1913 | Simon | ............................. 38/52 |
| 3,268,634 A | * | 8/1966 | Glaser | ...................... 264/36.12 |
| 3,640,028 A | * | 2/1972 | Richard | ........................ 451/50 |
| 4,894,958 A | | 1/1990 | Takasaki | |
| 5,611,723 A | | 3/1997 | Mitoma et al. | |
| 6,833,098 B2 | * | 12/2004 | Watabe et al. | ................ 264/139 |

FOREIGN PATENT DOCUMENTS

| | | |
|---|---|---|
| GB | 2194450 A | 3/1988 |
| JP | 59-81059 A | 5/1984 |
| JP | 60-232861 A | 11/1985 |
| JP | 02-191472 | 7/1990 |

* cited by examiner

*Primary Examiner*—Edmund H. Lee
(74) *Attorney, Agent, or Firm*—Birch, Stewart, Kolasch & Birch, LLP

(57) ABSTRACT

An attitude adjusting device (1) comprises a first roller (3), a second roller (5), a first stopper (7) and a second stopper (9). A golf ball (G) having a spew (B) is mounted on the first roller (3) and the second roller (5). Each of the first roller (3) and the second roller (5) includes a portion (11) having a small diameter. A groove (13) is formed on the surface of the portion (11) having a small diameter. With the rotations of the first roller (3) and the second roller (5), the golf ball (G) is rolled. When the spew (B) abuts on either or both of the first stopper (7) and the second stopper (9), the rolling is stopped. In a state in which the rolling is stopped, the spew (B) is extended in a horizontal direction. By the portion (11) having a small diameter and the groove (13), the rolling of the golf ball (G) is promoted.

5 Claims, 7 Drawing Sheets

(a)

(b)

ATTITUDE ADJUSTING DEVICE FOR SPHERE AND GOLF BALL MANUFACTURING METHOD

This Nonprovisional application claims priority under 35 U.S.C. § 119(a) on Patent Application No(s). 2002-335634 filed in JAPAN on Nov. 19, 2002, the entire contents of which are hereby incorporated by reference.

BACKGROUND OF THE INVENTION

1. Field of the Invention

The present invention relates to a device for adjusting an attitude of a sphere comprising a protruded portion on a surface in order to remove the protruded portion, for example.

2. Description of the Related Art

A golf ball is usually formed by upper and lower molds having hemispherical cavities, respectively. An injection molding method, a compression molding method or the like is employed for a molding method. By any molding method, the slight leakage of a molding material (rubber, synthetic resin or the like) from a parting line of the upper and lower molds cannot be avoided. Accordingly, a ring-shaped spew is generated on a portion corresponding to the parting line on the surface of the formed golf ball (which will be hereinafter referred to as a "seam"). In the injection molding method, a gate is provided on the parting line of a mold. The spew is also generated in a portion corresponding to the gate. These spews are to be removed.

The spew can be removed by devices disclosed in Japanese Unexamined Patent Publications Nos. Sho 60-232861, Sho63-174801, Sho 63-11266 and Hei 8-229810. In these devices, the spew is caused to abut on a cutting tool and is thus removed while a chucked golf ball is rotated. A grindstone, a sandpaper, a cutter blade or the like is used for the cutting tool. It is necessary to maintain the positional relationship between the spew and the cutting tool to be constant during the rotation of the golf ball. More specifically, the golf ball is to be chucked in such a manner that a plane including a seam and a rotating axis are orthogonal to each other. The golf ball is usually chucked in order to maintain the seam to be horizontal. The adjustment of the attitude of the golf ball to be carried out for the chucking has formerly been executed by a manual work. This work has a poor efficiency and the manufacturing cost of the golf ball is increased.

Japanese Unexamined Patent Publication No. Sho 59-81059 has disclosed a device for mechanically adjusting the attitude of a golf ball to cause a seam to be horizontal without depending on a manual work. FIG. 7(a) is a perspective view showing a part of an attitude adjusting device 101 and FIG. 7(b) is a plan view showing the same part. The attitude adjusting device 101 comprises a pair of rollers 103. A golf ball G having a spew B is mounted on the rollers 103. The rollers 103 rotate in a direction shown in an arrow of FIG. 7(a). By the rotation, the golf ball G is rolled. A pair of stoppers 105 are provided above the rollers 103. The spew B abuts on the stoppers 105 so that the rolling of the golf ball G is stopped. In a stoppage stage, the spew B becomes horizontal. The golf ball G is transported to a cutting step with this attitude maintained.

The golf ball G is spherical and the roller 103 is cylindrical. Therefore, the contact area of the golf ball G and the roller 103 is small. With the roller 103, kinetic force cannot be fully transmitted to the golf ball G. In the device 101, the golf ball G is insufficiently rolled. In some cases in which the rolling is insufficient, the spew B does not abut on the stopper 105 within a predetermined time so that the golf ball G is transferred to the cutting step without the horizontal spew B. If the spew B is not horizontal, it is not completely removed or a portion other than the spew B on the surface of the golf ball G is cut.

There has been proposed a device for deciding whether the spew B is horizontal prior to the cutting step. In this device, a golf ball having the spew B decided to be nonhorizontal is returned to the attitude adjusting device 101. By the return, a defective ball can be prevented from being generated. The return having a high rate deteriorates the productivity of the golf ball G.

SUMMARY OF THE INVENTION

The present invention provides an attitude adjusting device comprising a roller for rolling a sphere mounted thereon by a rotation, and a stopper for abutting on a protruded portion present on a surface of the sphere to stop the rolling of the sphere. The roller includes a portion having a small diameter which is concaved along the surface of the sphere.

In the attitude adjusting device, the contact area of the sphere and the roller is increased by the portion having a small diameter. The sphere is fully rolled in the attitude adjusting device. Therefore, the attitude defect of the sphere can be suppressed.

It is preferable that an axially sectional shape of a surface of the portion having a small diameter should be a substantially circular arc. A radius R1 of the circular arc is 1.00 to 1.10 times as large as a radius R2 of the sphere. In the attitude adjusting device, an attitude defect is caused with difficulty.

It is preferable that the roller should include a plurality of grooves extended in an axial direction on a surface of the portion having a small diameter. By the grooves, the kinetic force of the roller is transmitted to the sphere more greatly. The rolling of the sphere is promoted by the grooves.

In the case in which the attitude of the golf ball is to be adjusted in order to remove a spew generated in molding, a radius R1 of the portion having a small diameter is set to be 21.3 mm to 23.5 mm. In case of the golf ball, it is preferable that the rotating speed of the roller should be 30 rpm to 130 rpm. In case of the golf ball, it is preferable that the attitude adjusting device should comprise a pair of stoppers. Both of the stoppers are opposed to each other with the golf ball interposed therebetween. A difference (L−D) between a distance L between both of the stoppers and a diameter D of the golf ball is 0.1 mm to 0.6 mm.

A golf ball manufacturing method according to another invention comprises the steps of:

(1) forming a golf ball having a spew stuck onto a surface by a material put in a mold;

(2) rolling the golf ball over a roller including a portion having a small diameter which is concaved along a surface of the golf ball;

(3) stopping the rolling of the golf ball by abutment of the spew on a stopper; and (4) removing the spew.

The manufacturing method is excellent in productivity.

DESCRIPTION OF THE PREFERRED EMBODIMENTS

A preferred embodiment of the present invention will be described below in detail with reference to the drawings.

Figure 1:
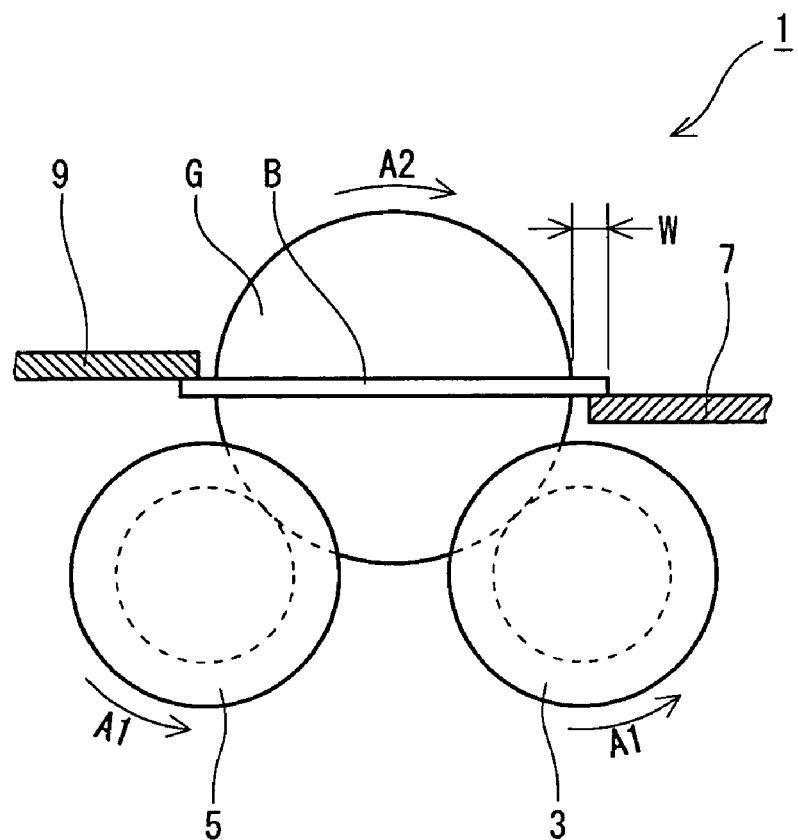
FIG. 1 is a front view showing an attitude adjusting device according to an embodiment of the present invention.
Figure 2:
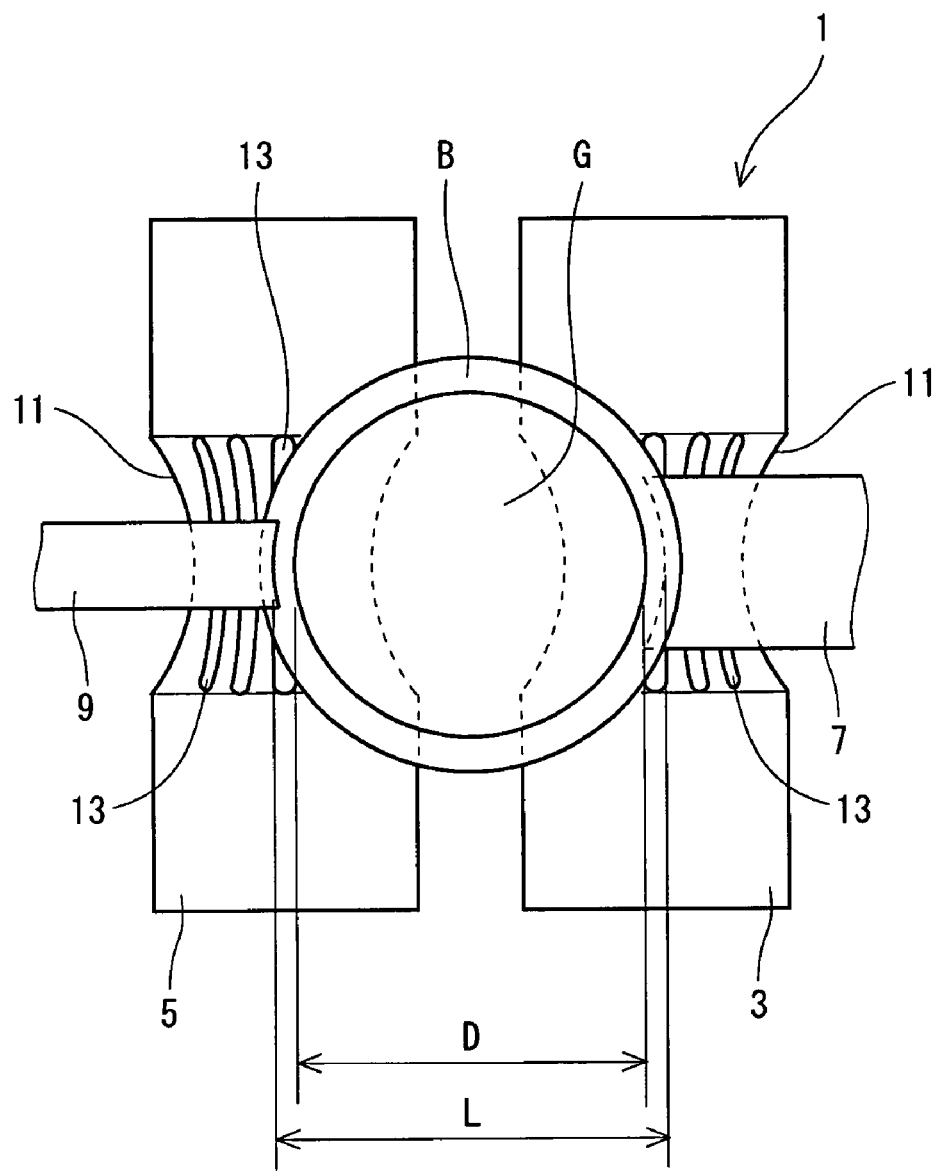
FIG. 2 is a plan view showing the attitude adjusting device in FIG. 1.
Figure 3:
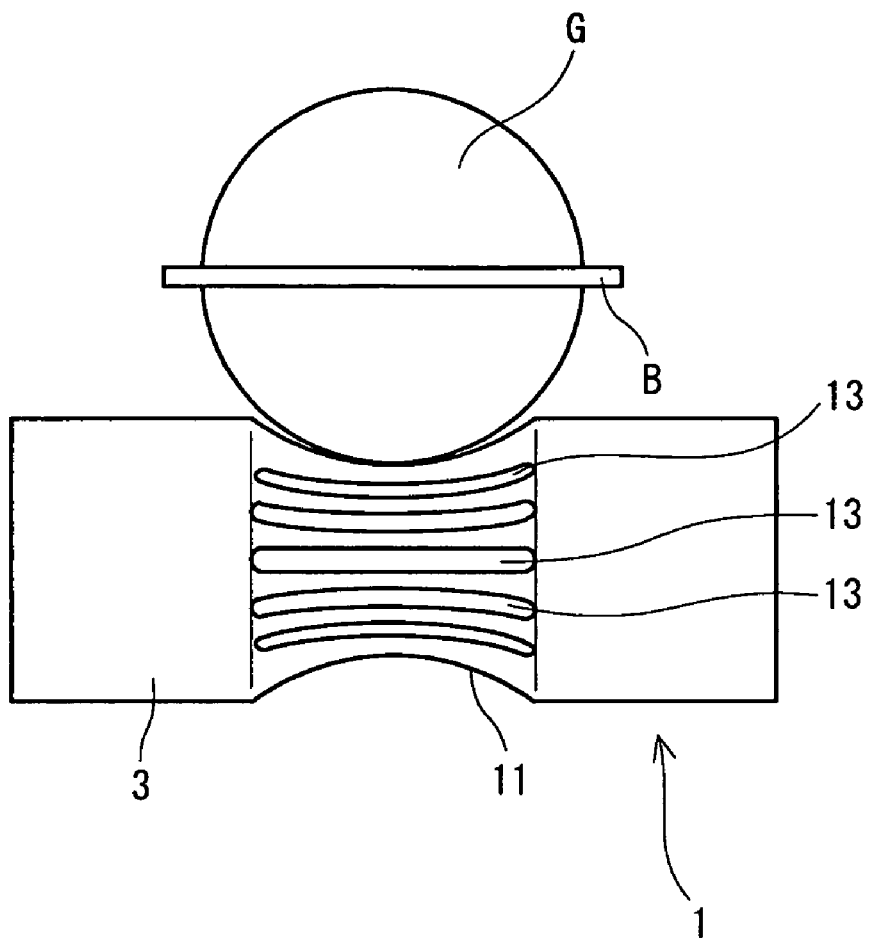
FIG. 3 is a left side view showing the attitude adjusting device in FIG. 1.

An attitude adjusting device 1 shown in FIGS. 1 to 3 comprises a first roller 3, a second roller 5, a first stopper 7 and a second stopper 9. In FIG. 3, the first stopper 7 and the second stopper 9 are not shown. A golf ball G to be a sphere is mounted on the first roller 3 and the second roller 5. A spew B to be a protruded portion is formed on the surface of the golf ball G. In this example, the spew B is ring-shaped. The spew B is generated in the molding of the golf ball G.

The first roller 3 and the second roller 5 are arranged in parallel with each other. The first roller 3 and the second roller 5 rotate by driving means which is not shown. The direction of the rotation is set to be a direction of an arrow A1 in FIG. 1. With the rotations of the first roller 3 and the second roller 5, the golf ball G is rolled in a direction of an arrow A2.

As is apparent from FIG. 1, the first stopper 7 and the second stopper 9 are opposed to each other with the golf ball G interposed therebetween. The tip of the first stopper 7 is slightly separated from the golf ball G. An interval between the tip of the first stopper 7 and the golf ball G is smaller than a width W of the spew B. The tip of the second stopper 9 is slightly separated from the golf ball G. An interval between the tip of the second stopper 9 and the golf ball G is smaller than the width W of the spew B. The first stopper 7 is positioned slightly below the second stopper 9. A distance in a vertical direction between the upper surface of the first stopper 7 and the lower surface of the second stopper 9 is almost equal to a thickness of the spew B.

When the spew B abuts on either or both of the first stopper 7 and the second stopper 9 by the rolling of the golf ball G, the rolling is stopped. In a state in which the rolling is stopped, the rollers 3 and 5 and the golf ball G slip from each other. FIG. 1 shows the golf ball G in a state in which the spew B abuts on the first stopper 7 and the second stopper 9 so that the rolling is stopped (in other words, an attitude is adjusted). As described above, the first stopper 7 is positioned slightly below the second stopper 9. Therefore, the spew B is extended in a horizontal direction during the stoppage. Thus, the attitude of the golf ball G is adjusted. The golf ball G is transported to a cutting step with this attitude maintained.

Figure 4:
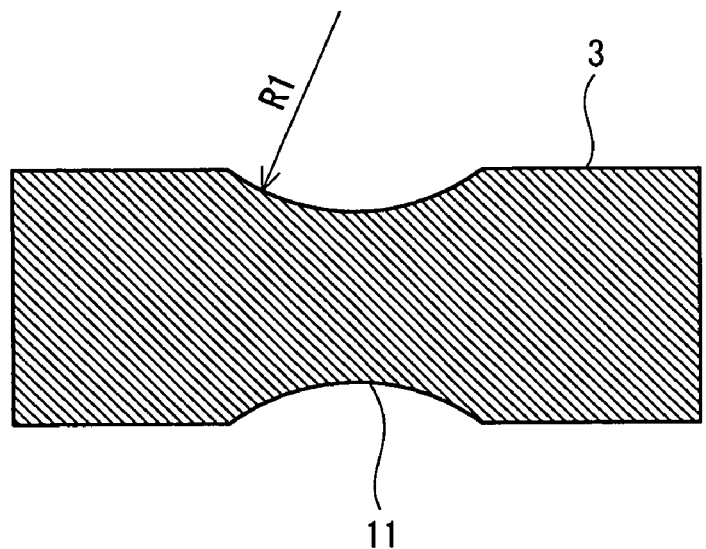
FIG. 4(a) is an axially sectional view showing a first roller of the attitude adjusting device in FIG. 1.
FIG. 4(b) is a radially sectional view showing the first roller in FIG. 4(a)
Figure 4:
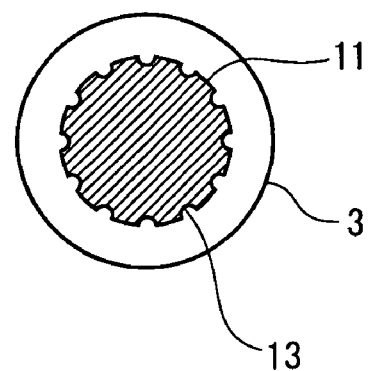

FIG. 4 is a sectional view showing the first roller 3 of the attitude adjusting device 1 in FIG. 1. FIG. 4(a) shows a section in an axial direction and FIG. 4(b) shows a section in a radial direction. The first roller 3 includes a portion 11 having a small diameter. The surface of the portion 11 having a small diameter is concaved. The axially sectional shape of the surface of the portion 11 having a small diameter is a substantially circular arc. The shape of the second roller 5 is identical to that of the first roller 3 and the second roller 5 also includes the portion 11 having a small diameter, which is not shown. As a matter of course, the shape of the second roller 5 may be different from that of the first roller 3.

It is preferable that a radius R1 of the circular arc should be 1.00 to 1.10 times as large as a radius R2 of a sphere to be an attitude adjusting object. If the radius R1 is smaller than the range, the sphere cannot enter the portion 11 having a small diameter. From this viewpoint, it is preferable that the radius R1 should be 1.01 times as large as the radius R2 or more. If the radius R1 is more than the range, the contact area of the sphere and the first roller 3 is insufficient. From this viewpoint, it is more preferable that the radius R1 should be 1.05 times as large as the radius R2 or less.

The mean radius R2 of the golf ball G obtained after molding is 21.4 mm. In the case in which the golf ball G is a sphere to be the attitude adjusting object, the radius R1 is preferably 21.3 mm to 23.5 mm, more preferably 21.3 mm to 22.5 mm, and particularly preferably 21.6 mm to 22.5 mm.

As shown in FIGS. 2, 3 and 4(b), the first roller 3 and the second roller 5 have a large number of grooves 13. The groove 13 is present on the surface of the portion 11 having a small diameter and is extended in an axial direction. By the groove 13, the force of each of the first roller 3 and the second roller 5 is transmitted to the golf ball G more greatly. The groove 13 promotes the rolling of the golf ball G. It is preferable that the number of the grooves 13 should be 4 to 32. It is preferable that the groove 13 should have a width of 0.2 mm to 3.0 mm. It is preferable that the groove 13 should have a length of 4.0 mm to 40 mm. It is preferable that the groove 13 should have a depth of 0.1 mm to 3.0 mm. It is preferable that an interval between the groove 13 and another adjacent groove 13 should be 0.3 mm to 5.0 mm. Rubber, soft resin or the like may be buried in the groove 13. Consequently, the rolling of the golf ball G is promoted.

In the case in which the attitude of the golf ball G is to be adjusted, it is preferable that the rotating speeds of the first roller 3 and the second roller 5 should be 30 rpm to 130 rpm. In some cases in which the rotating speed is less than the range, the rolling of the golf ball G is insufficient. From this viewpoint, it is more preferable that the rotating speed should be 50 rpm or more. If the rotating speed is more than the range, the golf ball G stopped to be rolled is apt to be rolled again. From this viewpoint, it is more preferable that the rotating speed should be 100 rpm or less.

In FIG. 2, an arrow L indicates a distance between the first stopper 7 and the second stopper 9. On the other hand, an arrow D indicates a diameter of the golf ball G. It is preferable that a difference (L–D) between the distance L and the diameter D should be 0.1 mm to 0.6 mm. If the difference (L–D) is less than the range, a portion other than the spew B abuts on the stopper so that the rolling of the golf ball G is stopped. From this viewpoint, it is more preferable that the distance (L–D) should be 0.2 mm or more. If the difference (L–D) is more than the range, the rolling is stopped with difficulty. From this viewpoint, it is more preferable that the difference (L–D) should be 0.5 mm or less.

Figure 5:
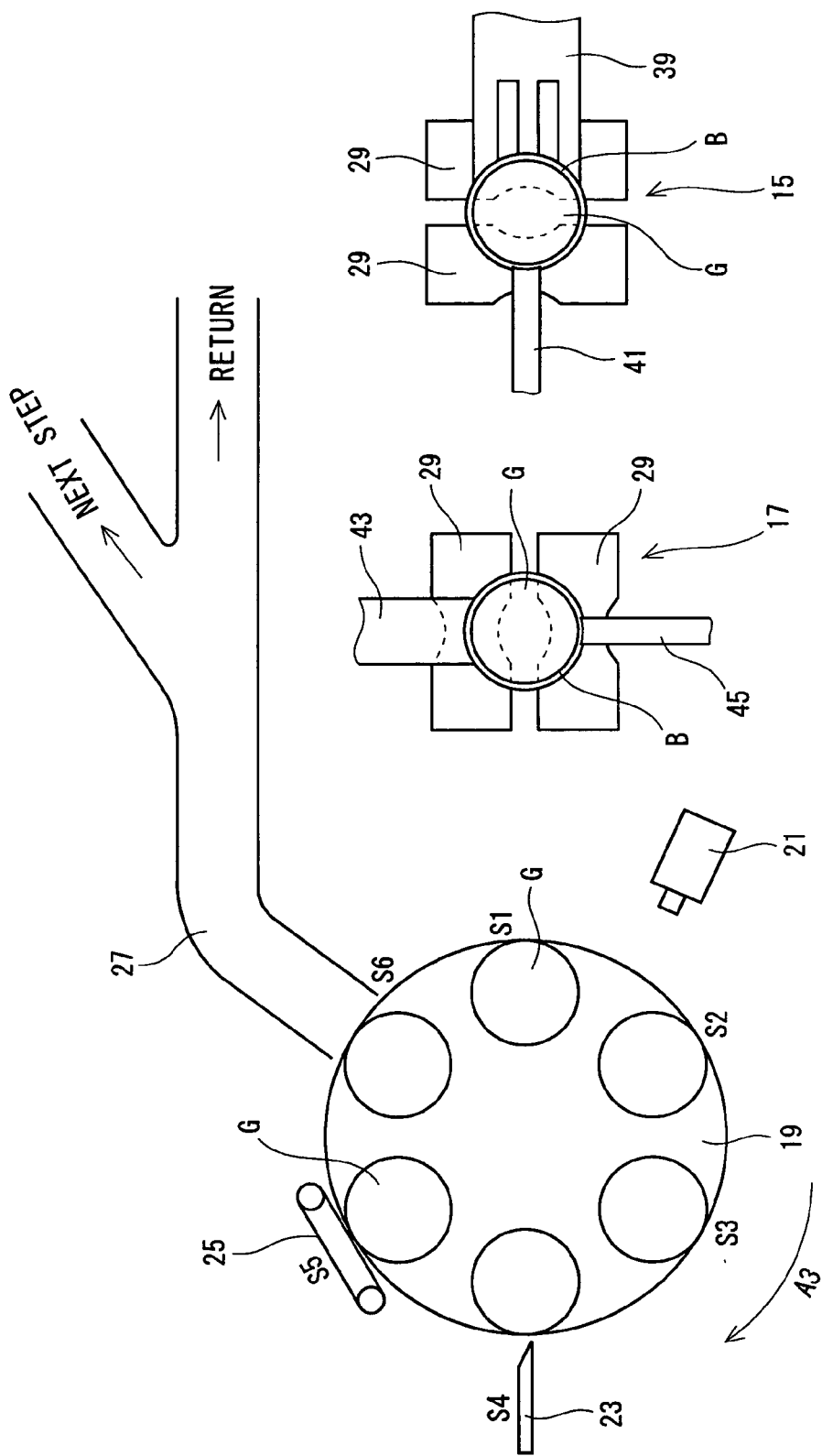
FIG. 5 is a plan view showing a part of a manufacturing apparatus to be used in a golf ball manufacturing method according to the present invention.
Figure 6:
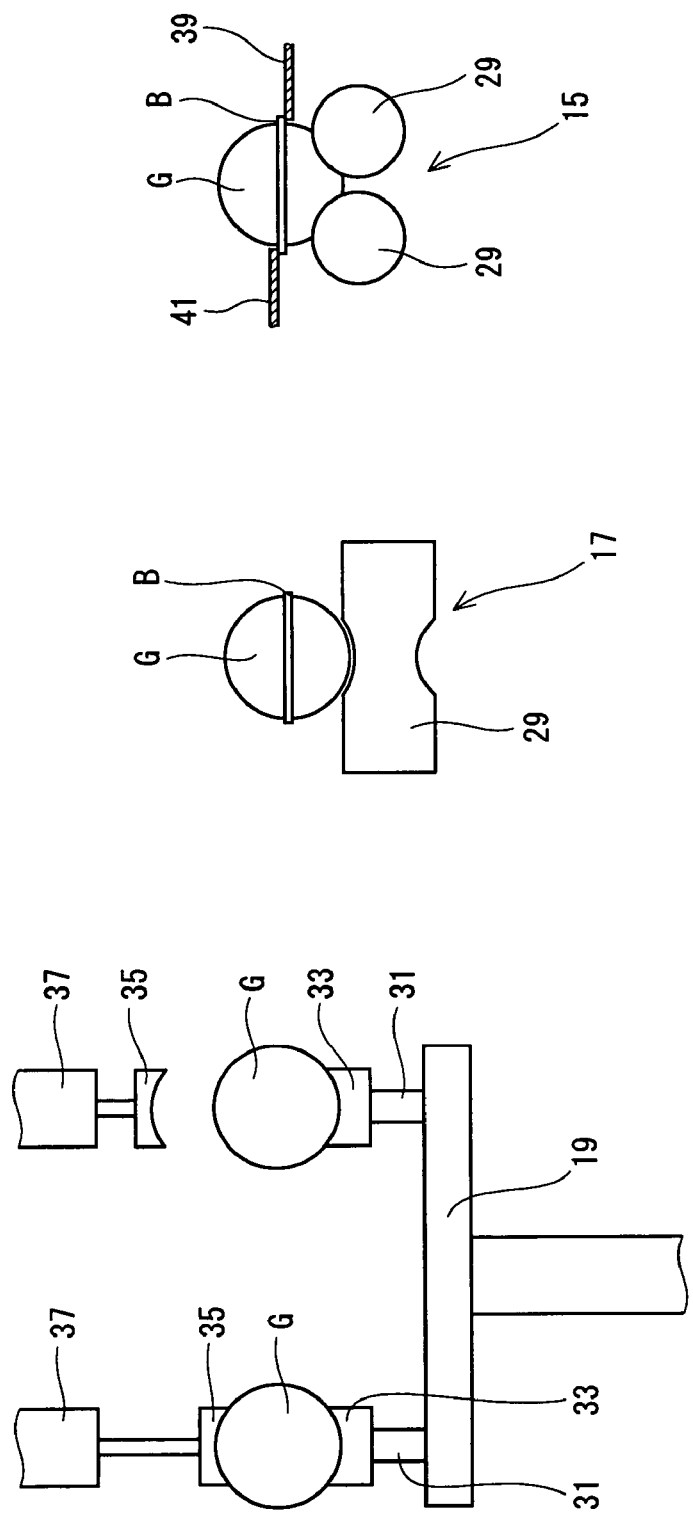
FIG. 6 is a front view showing the manufacturing apparatus in FIG. 5.
Figure 7:
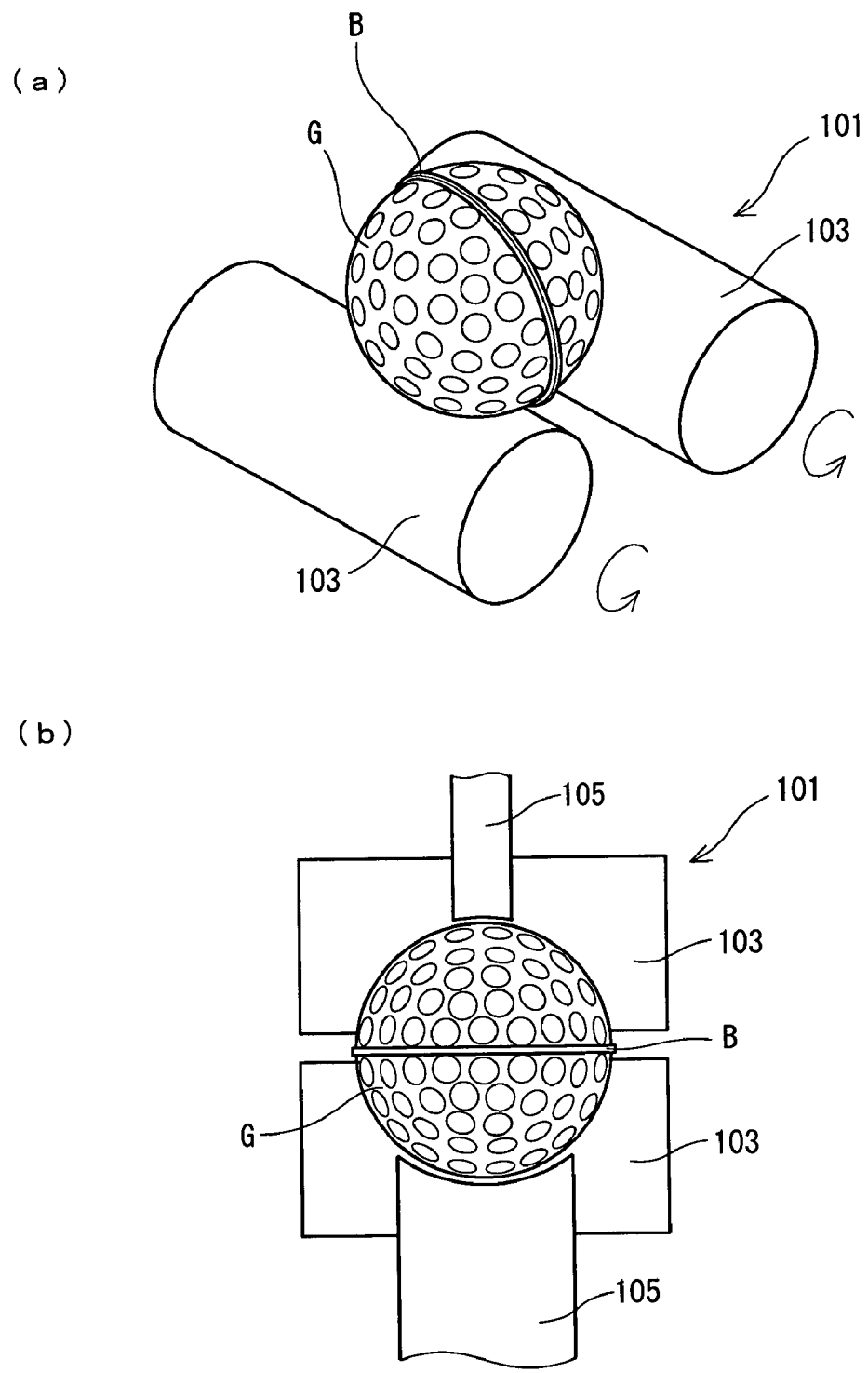
FIG. 7(a) is a perspective view showing a part of a conventional attitude adjusting device.
FIG. 7(b) is a plan view showing the attitude adjusting device in FIG. 7(a).

FIG. 5 is a plan view showing a part of a manufacturing apparatus to be used in a golf ball manufacturing method according to the present invention and FIG. 6 is a front view showing the same part. The manufacturing apparatus comprises a first attitude adjusting device 15, a second attitude adjusting device 17, a turntable 19, a camera 21, a cutter 23, a sandpaper 25 and a chute 27. Each of the first attitude adjusting device 15 and the second attitude adjusting device 17 includes a pair of rollers 29. Each of the rollers 29 takes the same shape as the shape of the first roller 3 shown in FIG. 4. Six struts 31 are fixed to the turntable 19 at an interval of 60 degrees. As shown in FIG. 6, a lower holding tool 33 is provided on the strut 31. By the rotation of the strut 31, the lower holding tool 33 is also rotated. An upper holding tool 35 is provided above the lower holding tool 33. The upper holding tool 35 is coupled to a cylinder 37. By the cylinder 37, the upper holding tool 35 can be moved vertically. The upper holding tool 35 is rotatable with respect to the cylinder 37.

In the manufacturing method according to the present invention, the golf ball G is first molded. For the molding, a mold having an upper portion and a lower portion is used. The upper and lower portions include hemispherical cavities, respectively. In the molding, a cover material (typically a synthetic resin composition) leaks out of the parting line of the upper and lower portions. Consequently, the ring-shaped spew B is formed on the surface of the golf ball G. In the case in which an injection molding method is employed, the spew B corresponding to a gate is also generated.

The golf ball G is transported to the first attitude adjusting device 15 and is then mounted on the roller 29. The roller 29 rotates so that the golf ball G is rolled. The spew B abuts on stoppers 39 and 41 in the middle of the rolling so that the rolling is stopped. In this state, the spew B is extended in a horizontal direction.

The golf ball G is transported to the second attitude adjusting device 17 and is then mounted on the roller 29. The attitude of the golf ball G has already been adjusted by the first attitude adjusting device 15. Therefore, the spew B abuts on stoppers 43 and 45 from the first. Even if the roller 29 rotates, the golf ball G is not rolled. Only in the case in which the adjustment of the attitude ends in failure in the first attitude adjusting device 15, the golf ball G is rolled so that the spew B abuts on the stoppers 43 and 45. By the abutment, the rolling is stopped so that the attitude of the golf ball G is adjusted. By providing the two attitude adjusting devices 15 and 17, it is possible to increase the success rate of the adjustment of the attitude.

The golf ball G having the attitude adjusted to cause the spew B to be horizontal is put on the lower holding tool 33 in a first station S1. The upper holding tool 35 is brought downward so that the golf ball G is interposed between both of the holding tools 33 and 35 and is thus fixed. By the rotation of the strut 31, the golf ball G is also rotated. The turntable 19 is rotated in a direction of an arrow A3 in FIG. 5. The rotation is intermittently carried out every 60 degrees. By the rotation of the turntable 19, the golf ball G in the first station S1 is moved to a second station S2. In the second station S2, the golf ball G is photographed by the camera 21. Image data obtained by the photographing are transmitted to a computer and whether the spew B is horizontal is automatically decided. The golf ball G is transferred to a third station S3 by the rotation of the turntable 19, and furthermore, to a fourth station S4. In the third station S3, any processing is not carried out over the golf ball G.

In the fourth station S4, the golf ball G is rotated, and at the same time, a seam is caused to abut on the cutter 23. Consequently, the spew B is removed. The golf ball G is further transferred to a fifth station S5. In the fifth station S5, the golf ball G is rotated, and at the same time, the seam is caused to abut on the sandpaper 25. Consequently, the surface of the seam is abraded so that the appearance of the golf ball G can be enhanced. In case of the golf ball G decided to be rejected in the second station S2, any processing is not carried out over the golf ball G in the fourth and fifth stations S4 and S5. The golf ball G is flipped away from the turntable 19 in a sixth station S6 and is then transported to the chute 27. The golf ball G from which the spew B is removed is transferred to the next step and the golf ball G from which the spew B is not removed is returned to the attitude adjusting device 15. By using the roller 29 including the portion 11 having a small diameter, it is possible to reduce the ratio of the golf ball G to be returned.

EXAMPLES

Example 1

By using the manufacturing apparatus shown in FIGS. 5 and 6, the attitude of a golf ball was adjusted. The roller of an attitude adjusting device includes a portion having a small diameter and the portion having a small diameter is provided with 16 grooves. A radius of curvature R1 of the portion having a small diameter is 21.5 mm. A rotating speed of the roller is 80 rpm. A distance L between stoppers is 43.2 mm. The attitudes of 100 golf balls were adjusted. As a result, a success rate was 100%.

Examples 3 and 4

An attitude was adjusted in the same manner as in the example 1 except that a distance L is set as shown in the following Table 1. A success rate is shown in the following Table 1.

Examples 2 and 5

An attitude was adjusted in the same manner as in the example 1 except that a rotating speed of a roller is set as shown in the following Table 1. A success rate is shown in the following Table 1.

Example 6

An attitude was adjusted in the same manner as in the example 1 except that a roller having no groove is used. A success rate is shown in the following Table 1.

Comparative Example 1

An attitude was adjusted in the same manner as in the example 1 except that a cylindrical roller having no groove is used. A success rate is shown in the following Table 1.

TABLE 1

| | Result of Evaluation | | | | | | |
|---|---|---|---|---|---|---|---|
| | Example 2 | Example 3 | Example 1 | Example 4 | Example 5 | Example 6 | Com. Example 1 |
| Roller with portion having small diameter | Yes | Yes | Yes | Yes | Yes | Yes | No Cylindrical |

TABLE 1-continued

| | Result of Evaluation | | | | | | |
|---|---|---|---|---|---|---|---|
| | Example 2 | Example 3 | Example 1 | Example 4 | Example 5 | Example 6 | Com. Example 1 |
| Groove of roller | Yes | Yes | Yes | Yes | Yes | No | No |
| Rotating speed of roller (rpm) | 50 | 80 | 80 | 80 | 110 | 80 | 80 |
| Distance L (mm) | 43.2 | 43.0 | 43.2 | 43.4 | 43.2 | 43.2 | 43.2 |
| L-D (mm) | 0.4 | 0.2 | 0.4 | 0.6 | 0.4 | 0.4 | 0.4 |
| Success rate of attitude adjustment (%) | 100 | 100 | 100 | 95 | 100 | 95 | 60 |

As shown in the Table 1, since the roller including the portion having a small diameter is used in the method according to each of the examples, the success rate is higher than that in the method according to the comparative example. From the results of evaluation, the advantage of the present invention is apparent.

The above description is only illustrative and can be variously changed without departing from the scope of the present invention.

What is claimed is:

1. A golf ball manufacturing method comprising the steps of:
   forming a golf ball having a spew stuck onto a surface by a material put in a mold;
   rolling the golf ball over a roller including a portion having a small diameter which is concave along a surface of the golf ball, the roller having a plurality of grooves on a surface of the portion having the small diameter, the grooves extending in an axial direction of the roller;
   stopping the rolling of the golf ball by abutment of the spew on a stopper;
   putting the golf ball on a machine for grinding with the attitude of the ball being kept; and
   removing the spew.

2. The method according to claim 1, wherein an axially sectional shape of a surface of the portion of the roller having a small diameter is a substantially circular arc and a radius R1 of the circular arc is 1.00 to 1.10 times as large as a radius R2 of the sphere.

3. The method according to claim 1, wherein an axially sectional shape of a surface of the portion of the roller having a small diameter is a circular arc and a radius R1 of the circular arc is 21.3 mm to 23.5 mm.

4. The method according to claim 1, wherein a rotating speed of the roller is 30 rpm to 130 rpm.

5. The method according to claim 1, wherein the stopper comprises two stopper parts opposed to each other with the golf ball interposed therebetween, positions of both of the stopper parts being set in such a manner that a difference (L−D) between a distance L between the stopper parts and a diameter D of the golf ball is 0.1 mm to 0.6 mm.

* * * * *

UNITED STATES PATENT AND TRADEMARK OFFICE
CERTIFICATE OF CORRECTION

PATENT NO.       : 7,618,569 B2                                    Page 1 of 1
APPLICATION NO. : 10/712095
DATED            : November 17, 2009
INVENTOR(S)      : Kazushige Sugimoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 486 days.

Signed and Sealed this

Twenty-sixth Day of October, 2010

David J. Kappos
*Director of the United States Patent and Trademark Office*